UNITED STATES PATENT OFFICE.

ROBERT M. CRAIG, OF PATERSON, NEW JERSEY.

COMPOSITION FOR FINISHING WALLS.

1,104,782. Specification of Letters Patent. Patented July 28, 1914.

No Drawing. Application filed August 2, 1912. Serial No. 712,942.

*To all whom it may concern:*

Be it known that I, ROBERT M. CRAIG, a citizen of the United States, residing at Paterson, in the county of Passaic and State of New Jersey, have invented certain new and useful Improvements in Compositions for Finishing Walls, of which the following is a specification.

The invention relates to compositions for finishing the exterior and interior of walls and ceilings and has for its object the provision of a composition that not only gives an ornamental finish to the walls but also makes said walls impervious to moisture.

In preparing my composition I take one-half pint of powdered mineral wax, one quart of cement, which may be gray La Farge Portland cement or Atlas white stainless Portland cement, in accordance with the color that I desire to have the composition when completed, one pint of ordinary table salt, one quart of saturated solution of washing soda and mix these ingredients with one and three-quarters gallons of hot water, the hot water being required in order to melt the wax and cause it to thoroughly mix with the other ingredients.

This composition may be applied to the exterior walls of the building or may be applied over the rough plaster coat on the interior walls and ceilings, the application being made first with a brush and then rubbed down with burlap or suitable rough fabric.

The composition is not only ornamental but renders the walls impervious to moisture.

Should it be desired to use a composition that is colored, the coloring matter may be applied while mixing it.

Should it be desired to stop a leaky wall, a larger proportion of saturated solution of washing soda and a smaller proportion of clear water may be used, and if desired all of the water used for mixing the composition may be previously saturated with the soda. It will be furthermore, understood that if desired a mixture of gray La Farge and white stainless cement may be used, in the proportion of one-half of each or any other proportion, the object being to secure a light gray coloring for the preparation. It will be furthermore understood that if it is desired to have the preparation left on the wall or ceiling with a rough finish, it may be applied with a brush only and the rubbing down with burlap or other suitable fabric heretofore described, may be omitted.

Having thus described my invention what I claim is:—

A moisture proof composition for coating walls consisting of one half pint of powdered mineral wax, one quart of Portland cement, one pint of table salt, one quart of saturated solution of washing soda, and one and three-quarters of a gallon of water.

In testimony whereof I affix my signature in presence of two witnesses.

ROBERT M. CRAIG.

Witnesses:
ALEXANDER TEMPLETON,
JOHN HODGE.

Copies of this patent may be obtained for five cents each, by addressing the "Commissioner of Patents, Washington, D. C."